United States Patent
Kilibwa (12)

(10) Patent No.: US 6,217,930 B1
(45) Date of Patent: Apr. 17, 2001

(54) BETAINE AND BAKERY PRODUCTS

(75) Inventor: Margaret Kilibwa, Stanford, CT (US)

(73) Assignee: Cultor Food Science, Inc., Ardsley, NY (US)

(*) Notice: Subject to any disclaimer, the term of this patent is extended or adjusted under 35 U.S.C. 154(b) by 0 days.

(21) Appl. No.: 09/511,976

(22) Filed: Feb. 24, 2000

Related U.S. Application Data

(60) Provisional application No. 60/121,487, filed on Feb. 24, 1999.

(51) Int. Cl.$^7$ ....................................................... A21D 8/00
(52) U.S. Cl. ......................... 426/549; 426/552; 426/556; 426/572
(58) Field of Search .................................. 426/549, 552, 426/556, 572

(56) References Cited

U.S. PATENT DOCUMENTS

| | | |
|---|---|---|
| 3,876,816 | 4/1975 | Zafforoni . |
| 4,265,913 | 5/1981 | Eichelburg . |
| 4,456,625 | 6/1984 | Durst . |
| 4,530,799 | 7/1985 | Hirsbrunner et al. . |
| 4,652,711 | 3/1987 | Hirsbrunner et al. . |
| 4,774,099 | 9/1988 | Feeney et al. . |
| 5,133,984 | 7/1992 | Murphy et al. . |
| 5,147,665 | 9/1992 | Furcsik . |
| 5,204,375 | 4/1993 | Kusakawa et al. . |
| 5,232,719 | 8/1993 | Lad et al. . |
| 5,254,353 | 10/1993 | Huang et al. . |
| 5,260,082 | 11/1993 | delValle et al. . |
| 5,354,567 | 10/1994 | Huang et al. . |
| 5,397,786 | 3/1995 | Simone . |
| 5,403,610 | 4/1995 | Murphy et al. . |
| 5,472,724 | 12/1995 | Williams et al. . |
| 5,492,710 | 2/1996 | Seyam . |
| 5,514,387 | 5/1996 | Zimmerman et al. . |
| 5,527,866 | 6/1996 | Corrigan et al. . |

FOREIGN PATENT DOCUMENTS

| | | |
|---|---|---|
| 581140 | 12/1977 | (JP) . |
| 58-009642A | 1/1983 | (JP) . |
| 59-30056 | 7/1984 | (JP) . |
| 63-017679 | 7/1986 | (JP) . |
| 63-109762 | 10/1986 | (JP) . |
| 57047467 | 3/1987 | (JP) . |
| 3123461 | 5/1991 | (JP) . |
| 209051 BA | 3/1994 | (JP) . |
| 7046972 | 2/1995 | (JP) . |
| 8289761 | 4/1995 | (JP) . |
| 10088114 | 4/1998 | (JP) . |
| 08268887 | 6/1998 | (JP) . |

*Primary Examiner*—Nina Bhat
(74) *Attorney, Agent, or Firm*—Scully, Scott, Murphy & Presser

(57) ABSTRACT

The present invention is directed to a baked good product comprising about 0.5 to about 5% betaine. It is also directed to a process for improving the organoleptic properties of the baked good by adding, betaine in effective amounts to the uncooked ingredients of the baked goods, mixing said betaine therewith and baking the product. It is also directed to the process of improving the shelf life of a baking good by adding betaine to the uncooked ingredients of the baked good product, mixing the betaine containing ingredient and baking the product. The present invention is directed to a process for retarding the loss of moisture in a baked good by adding an effective amount of betaine to the uncooked ingredients of the baked good product, mixing the betaine containing ingredient and baking the product.

33 Claims, No Drawings

BETAINE AND BAKERY PRODUCTS

This application claims priority from U.S. Provisional Application No. 60/121,487, filed Feb. 24, 1999.

FIELD OF THE INVENTION

The present invention relates to baked goods including those which are made from bread-type dough systems, sweet dough systems, batter systems, topping and creme systems and frozen bread-type systems, and a method of making the same. The present invention also relates to methods of retarding moisture migration in a baked good, retaining moisture in a baked good, increasing the shelf life of baked goods and improving the organoleptic qualities thereof. More specifically, the present invention relates to bakery products especially those having intermediate and high moisture content which include betaine as one of the essential ingredients and to the improvements associated therewith.

BACKGROUND OF THE INVENTION

In the bakery area, continual efforts are directed towards producing appetizing products which must be pleasing to both the eye and to the palate. Bakers have historically been plagued by the desiccation of baked goods and by the deterioration of the organoleptic properties, including appearance, flavor, and texture resulting therefrom.

This deterioration in texture, appearance and taste of baked goods is believed to be due in part to moisture migrating from the product's high moisture content area to an area with reduced moisture, either into the atmosphere or another portion of the baked good such as into the icing, if present, on the baked good. This moisture migration results in a dried baked good and/or a wetter glaze or icing on the baked good, if present. In any event, as a result thereof, the appearance, taste and texture is unsuitable to the consumer and thus, the moisture migration ultimately results in a shorter shelf-life of the baked good.

Bakers have been aware of this problem for years, but have not found a satisfactory solution thereto. For example, they attempted to solve this problem by coating baked goods with a sealant to increase the water retention thereof. Early attempts to solve this problem included the addition of fats and waxes and simple syrups to the baked good. Although fats and waxes worked well as sealants, they created an undesirable mouth feel and appearance to the product. In addition, if the baked goods contained icing and glazing, these fats and waxes were unsuitable because the glazes or icings did not readily adhere to the slick surface thereof.

Syrups also proved to be unsatisfactory as sealants. Early recipes for those syrups included those in which sugar, water and corn syrup were combined. But, these proved to be marginally effective. They did not prevent moisture migration over prolonged shelf life nor did they sufficiently prevent moisture migration from products with high water activity.

Therefore, there is still a need in the baked goods area for a component which not only overcomes shortcomings of the prior art, but also reduces moisture migration, extends the shelf-life and does not produce a product with an undesirable appearance, taste or texture. The present inventors have found such a component. More specifically, they have found that the addition of betaine to the baked goods provides a product which not only retards the moisture migration but at the same time improves the organoleptic properties thereof.

Betaine (or trimethylglycine; molecular weight 117.15) is not a new compound. It is a natural product found in sugar beets. In fact, together with L-glutamine, betaine forms the major component of nitrogen compounds in sugar beets that are soluble in water. These compounds have been known for more than a hundred years; in 1866, for example, betaine was isolated from concentrated juices of Beta vulgaris (sugar beet).

Until 1960, betaine was used mainly as a pharmaceutical preparation for the stimulation of hydrochloric acid secretion in the stomach. Since then, it has been discovered that addition of betaine to animal feeds highly stimulates the weight increase of animals because it enhances the rate of methionine synthesis; betaine donates a methyl group to homocysteine by which methionine is formed (for an optimal increase of animal weight it is important that, besides betaine, the feed contains the right amounts of methionine, homocysteine and cysteine).

In addition, natural betaine, 1-carboxy-N,N,N-trimethyl methaminium hydroxide, plays an important role in life maintaining processes in nature. Various micro-organisms depend upon betaine for their survival. Betaine is important for the control of respiration, osmoregulation and nitrogen fixation of several useful bacteria. The function of useful microbes in soil that fix atmospheric nitrogen necessary for plants to grow is stimulated by betaine.

It has been found that betaine does not possess any skin-irritating properties when used in cosmetics, improves the skin compatibility thereof and has moisturizing properties. Betaine has beneficial effects in toothpaste; it appears that betaine not only reduces the skin-irritating effects of toothpaste components, but also is useful for relieving the symptoms in patients with dry mouth. See, Söderling, et al. *ACTA ODONTOL SCAND* 1998, 56, 65–69.

In the mammalian body, betaine is known to have a vitamin resembling function. Its mechanism of action is closely related to that of Folic Acid and Vitamin $B_{12}$. Betaine is present in vital organs such as the liver, kidney, testes, spleen, pancreas and heart. Betaine is often times referred to as a lipotropic factor since it reduces the risk for fatty liver. Its biochemical derivative in the liver, dimethyl glycine, is known to enhance immune response. Moreover, betaine appears to have a key role in protecting kidney cells against highly osmotic urine.

In the food industry, betaine has been mainly used as a food preservative or as a dietary supplement in citrus juices as well as rehydration drinks.

However, betaine has recently been found to have a synergistic effect with L-ascorbic acid in the manufacture of bread. See Japanese Kokou No. 59-30057 ("JP '057"). Specifically, JP '057 discloses a bread making process wherein a dough conditioner consisting of 10–500 ppm L-ascorbic acid (an anti-oxidant) and 20–200 ppm glycine betaine is employed. JP '057 indicates that improvement in bread making can be obtained only when L-ascorbic acid and glycine betaine are used together. It shows that there is a critical relationship between the glycine betaine and ascorbic acid. That is, the ratio of glycine betaine and ascorbic acid must be present within a critical range. Otherwise the alleged benefits are not realized. Thus, JP '057 does not recognize any advantages of utilizing betaine without the presence of ascorbic acid. It should also be noticed that in JP '057 betaine and ascorbic acid are added to the bread in very low amounts, in parts per million. JP '057 discloses that the amount of betaine glycine present in the bread formulation ranges from 20–200 ppm. It does not disclose any bread formulation containing amounts greater than 200 ppm of betaine. Thus, JP '057 is very limited in its teaching; it requires ascorbic acid to be present simultaneously therewith and there is a critical range of betaine to ascorbic acid for the synergism to be manifested. Moreover, JP '057 does not disclose or teach adding larger amounts of betaine glycine to the bread product, or the effects thereof.

However, the present inventors have found that the addition of betaine in larger amounts than in JP '057 imparted several desirable characteristics to the baked goods. It prolongs moisture retention and the shelf-life, as discussed hereinabove. It also improves the mouthful and appearance of the baked good. In addition, it also has other unexpected advantages. It enhances flavor to the baked goods so that less salt is required; it lowers water activity; prevents syneresis; and facilitates batter and dough processing. It also improves the organoleptic properties of the baked good. The inventors have found that this one component accomplishes objectives served by the combination of other components normally added to foods, namely emulsifiers, gums, enzymes, especially amylases, fibers and fruit. These advantages have not been realized heretofore by the use of only one component.

Japanese Patent 59-30056 ("JP '056") discloses a method for preparing a wheat paste or batter from wheat flour or flour comprised primarily of wheat flour, by adding betaine thereto and stirring the resulting mixture. However, the teachings therein relate to fried foods. According to JP '056, betaine is added to suppress the gluten formed therein. The teachings therein are specific for those fried foods. They do not relate to baked goods, especially those in which wheat flour is an ingredient, since, the objective is to increase, not decrease, gluten formation. Moreover, JP '056 does not consider the interaction between the various components of the foods, including the fat and betaine, which latter interaction is critical in controlling various characteristics of the baked good, including the viscosity of the batter or paste. However, the present inventors have realized that there is a critical ratio of fat to betaine that is important in imparting the improved qualities thereto.

SUMMARY OF THE INVENTION

The present invention relates to bakery products containing betaine in amounts greater than 1000 ppm. The bakery products of the present invention also contain fat. The weight ratio of fat to betaine in the bakery products of the present invention ranges from 50:1 to 3:2. An embodiment of the present invention is directed to baked goods comprising about 0.5% to about 5.0% of betaine therein. In addition, the present invention is directed to the process of making baked goods by adding betaine to the unbaked ingredients thereof, which unbaked ingredients comprise fat, whereby the weight ratio of fat to betaine ranges from about 50:1 to about 3:2, mixing the components thereof until the betaine is at least substantially uniformly distributed therein, and baking the resulting mixture. It is also directed to a method of retarding moisture migration in a baked good by adding to the unbaked components of the baked good a moisture retaining effective amount of betaine and mixing the betaine therewith until the betaine is at least substantially uniformly distributed therein and baking the resulting mixture. Moreover, the present invention is directed to a method of increasing the shelf life of a baked good by adding a shelf-life enhancing effective amount of betaine to the unbaked ingredients of the baked good, mixing the betaine containing ingredients until the betaine is substantially uniformly distributed therein and baking the resulting mixture. The present invention is also directed to a method of improving the organoleptic properties of a baked good comprising adding an organoleptic improving effective amount of betaine to the unbaked ingredients of a baked good, mixing the betaine ingredients until the betaine is substantially uniformly distributed therein and then baking the mixture thereof.

DETAILED DESCRIPTION OF THE INVENTION

As indicated hereinabove, the presence of effective amounts of betaine in the baked good, in accordance with the present invention, imparts one or more advantages thereto which are not realized in its absence. These advantages include the ability of the baked good to retard moisture migration from the baked good, thereby permitting the baked good to retain its moisture for a considerably longer period of time. It also retards staling of the baked good and imparts a smoother and softer texture to the product. In addition, betaine also facilitates the preparation of the baked goods. When added to the unbaked ingredients of the baked good in the aforementioned weight ratio of fat content to betaine, it decreases the viscosity thereof, thereby facilitating the mixing and the processing in preparing the baked good product. Another advantage is that the addition of betaine to the baked good enhances the organoleptic properties.

As used herein, the term betaine refers to the compound trimethylglycine and its food acceptable salts thereof.

An embodiment of the present invention is directed to a betaine containing baked good.

The betaine is present in the baked goods in amounts within a specific range effective to manifest itself in an enhancing effect that is observable with the naked eye. At levels below that amount, certain characteristics imparted to the baked good, e.g., moisture retention, are not observed or measured. At the other extreme, if present in too high a concentration, the dough or batter containing betaine or other betaine containing ingredients prior to baking becomes too difficult to work with. For example, the dough may become too sticky, the batter viscosity may become drastically reduced so that the product would not be organoleptically acceptable to consumers, cookie spread may become uncontrollable and dough machinability may become difficult. The betaine is thus present in the baked goods in amounts between those ranges.

In a preferred embodiment, the betaine is present in the baked goods in amounts ranging from about 0.5% to about 5% by weight. In other words, in this preferred embodiment, the betaine is present at a level of at least about 5000 ppm and up to about 50,000 ppm. In a further preferred embodiment, the betaine is present in amounts ranging from about 0.5% to about 4.0% and even more preferably from about 1% to about 4% and most preferably at about 3% (dry weight).

In another preferred embodiment, the betaine containing baked good of the present invention does not contain ascorbic acid.

Moreover, it is necessary for the betaine to be present in a particular weight ratio to fat or fat substitute in the baked good. Without wishing to be bound, it is believed that the betaine interacts therewith to control the characteristics, including viscosity, of the batter or paste of the baked goods. Thus, the present inventors have found that the critical weight ratio of betaine to fat ranges from about 50:1 to about 3:2, more preferably from about 25:1 to about 2:1, and still more preferably from about 10:1 to about 3:1. A particularly preferred ratio is about 5:1.

The term "baked goods" is a term of art and is understood by the skilled artisan. As used herein, it is used as defined in 21 C.F.R. §170.3, i.e., it includes ready to eat and all ready to bake products, flours and mixes requiring preparation before serving. It encompasses a number of products, which include and are not limited to cakes, crackers, cookies, brownies, muffins, rolls, bagels, strudels, pastries, croissants, biscuits, bread, and bread products (e.g. pizza), buns, fillings and jellies and the like.

Baked goods are comprised of at least some common ingredients. They all contain a sweetener, such as sugar, water and fat. Most, except for example, toppings and creme, also contain flour. However, as described hereinbelow, additional ingredients may be added to the baked goods.

The ingredients of the baked goods as well as the amounts thereof vary, depending upon the baked goods. Nevertheless, many baked goods, especially those used in the present invention, are comprised of at least those fundamental ingredients described hereinabove. Most baked goods, especially bread and bread products, batters, and sweet dough systems, e.g., cakes, muffins and brownies, are comprised of a base flour component, which may be made into a dough or a batter. The term "dough" as used herein is a mixture of flour and other ingredients stiff enough to knead or roll. The term "batter" as used herein consists of flour, liquids such as milk or water and other ingredients and is thin enough to pour or drop from a spoon.

The type of flour utilized depends upon the desired product. The flour utilized is an edible non-toxic flour that is conventionally utilized in baked goods. It is preferred that the flour used is a bleached bake flour, although a general purpose or unbleached flour can be substituted. Flours which have been treated in other manners to produce flour of the quality of bleached cake flour can also be utilized. Flour can be enriched with additional vitamins and minerals. Protein flours, such as soy flour, wheat flour or other glutenous flour, such as graham flour can also be used.

The base flour component may be a wheat flour, corn meal, whole grain and/or fractions of whole grains, such as wheat, bran and oatmeal or mixtures thereof; however any starches or farinaceous material can also be employed. The starch used can be any of the common food starches, for example potato starch, corn starch, wheat starch, barley starch, oat starch, tapioca starch, arrow root and sago starch. Modified starches and pregelatinized starches can also be used.

In the betaine containing baked goods of the present invention, the flour, if present, is present in amounts ranging from about 15% to about 60% (dry weight) and more preferably from about 23% to about 48% (dry weight).

A component found in all baked goods is fat or oil.

The fats or oils used, especially those suitable for use as shortening herein, may be any edible fat or oil or mixture thereof suitable for baking applications. They may be plastic or fluid. Examples include vegetable oils, tallow, lard, marine oils and mixtures thereof, which are fractionated, partially hydrogenated and/or interesterified, and these may be used in the present invention. Edible reduced or low calorie or non-digestible fats, fat substitutes or synthetic fats, such as polyesters of sucrose, polydextrose, or sugar alcohols, such as lactitol, maltitol, isomalt; HSH, and the like may also be used. Shortenings, fats or mixtures of hard and soft fats may also be used. Moreover, the shortenings can be principally derived from edible triglycerides. Exemplary of the edible triglycerides which can be used include naturally occurring triglycerides derived from vegetable sources, such as cotton seed oil, soybean oil, peanut oil, linseed oil, sesame oil, palm oil, palm kernel oil, rapeseed oil, safflower oil, coconut oil, corn oil and sunflower seed oil mixtures thereof, and the like. Marine and animal oil, such as fish oils e.g., sardine oil, menhaden oil, babassu oil, lard and tallow or hydrogenated lard, and the like may also be used. Synthetic triglycerides, as well as natural triglycerides of fatty acid may also be used. The fatty acids may have a chain length of from 8 to 24 carbon atoms. Shortenings or fats which are solid or semi-solid at room temperatures, for example, from about 75° F. to about 95° F. may also be used.

Preferably, the fat content of the baked good of the present invention is present in amounts ranging from about 2% to about 35% (dry weight) and more preferably from about 3% to about 29%.

A sweetener, such as a sugar, also is present in the baked goods of the present invention. Examples of sweeteners include sucrose, fructose, lactose, dextrose, galactose, sugar alcohols, maltodextrin, corn syrup solids, hydrogenated starch hydrolysate, glucose syrup solids, honey, maple sugar, brown sugar and the like and carbohydrate bulking agents of low sweetness in combination with a high potency sweetener may be used. Suitable high potency sweeteners include aspartame, cyclamate, saccharin, acesulfame, neohesperidin, dihydrochalcone, sucralose, alitame, stevia sweeteners, glycyrrhizin, thaumatin and the like and mixtures thereof. The preferred high potency sweeteners are aspartame, cyclamates, saccharin, and acesulfame-K, and the like.

Examples of sugar alcohols may be any of those typically used in the art and include sorbitol, mannitol, xylitol, maltitol, isomalt, lactitol, and the like.

Bulking agents, as defined herein, may be any of those typically used in the art and include various forms of polydextrose, cellulose and its derivatives, maltodextrin, hydrogenated starch hydrolysates, sugar alcohols, L-sugars which are less sweet than sucrose, fructooligosaccharides, gum arabic and the like.

Alternatively, a combination of sugar and sugar substitutes may be utilized.

The sweetener is present in sweetening effective amounts. It is preferred that the sweetener is present in amounts ranging from about 1% to about 40% (dry weight) and more preferably from about 1% to about 30% and even more preferably from about 3% to about 25% (dry weight).

When reduced fat, reduced calorie baked goods are desired, it is preferred that polydextrose and sugar alcohols, either alone or in combination be utilized. When polydextrose is employed, it is preferably used in amounts ranging from about 2% to about 15% (dry weight). When sugar alcohol is employed, the sugar alcohol is preferably present in amounts ranging from 2% to about 12% (dry weight).

Unless indicated to the contrary, the term "fat content" is defined as the amount of fat, fat substitute or combination thereof in the baked good.

Another component present in all baked goods is water. Water is present in amounts sufficient to provide the desired consistency to enable proper forming, machining and cutting of the baked good product prior or subsequent to cooking (baking). The total moisture content of the baked good will include any water directly added as well as water present in a separately added ingredient, e.g., flour (which includes about 12% to about 14% by weight moisture), liquids and the like. It is preferred that water is present in amounts ranging up to about 25% by weight of the baked goods product. However, in one embodiment of the present invention, it is preferred that the water be present in amounts ranging from about 3% to about 25%. In this embodiment, it is more preferred that the water be present in amounts ranging from about 3% to about 15% and even more preferably from about 5% to about 12% by weight. In another embodiment, it is preferred that the betaine baked good contain about 8% to about 25% and more preferably from about 8% to about 15%.

In addition, the baked good may include other additives conventionally used in baked goods.

The "conventional additives" include such ingredients as leavening agents, flavors, colors, nutrients, anti-oxidants, anti-microbial agents, milk, milk-by products, egg or egg-by-products, cocoa, vanilla, or other flavoring, as well as inclusions, such as nuts, raisins, cherries, apples, apricots, peaches, or other fruits, citrus peel, preservative, coconuts, flavored chips, such as chocolate chips, butterscotch chips, caramel chips and the like. Emulsifiers such as lecithin and monoglycerides may also be present, but inasmuch as the betaine in the products of the present invention has emulsifying properties, usually an emulsifier is not required.

The leavening agent may be a chemical leavening or yeast leavening. The chemical leavening agent can comprise baking soda, for example, sodium, potassium, or ammonium bicarbonate, and a baking acid, such as sodium aluminum phosphate, monocalcium phosphate, and dicalcium phosphate or mixtures thereof. Alternatively, a small amount of baking soda can be used alone. The selection is within the skill of one in the art.

Some baked good products, e.g., brownies, may contain cocoa. The cocoa used in this invention is either natural or "Dutched" chocolate from which a substantial portion of the fat or cocoa butter has been expressed or removed by solvent extraction, by pressing or by other means. Cocoa suitable for use may contain from 1% to 30% fatty constituents.

Dutched chocolate is prepared by treating cocoa nibs with an alkali material such as potassium carbonate in a manner well known in the art. Generally, it tends to have a darker flavor and also can be more flavorful than natural cocoas.

Chocolate can be used and it is intended that chocolate, as described above, is to be encompassed by the term cocoa. When chocolate is used, it should be in a finely divided form. It may be necessary to reduce the amount of shortening in the mix when chocolate is used because of the additional fat present as cocoa butter. It may also be necessary to add larger amounts of chocolate as compared to cocoa in order to provide an equivalent amount of flavoring and coloring.

Preferred baked goods of the present invention can be classified into five groups. They are products from bread-type dough systems, sweet dough systems, batter systems, topping and creme systems, and frozen bread-type dough systems. The dough systems are generally characterized as being a flour-based system whereas the batters, toppings and cremes are more water-based.

Bread-type dough systems are employed in the present invention in making such bread type products as white pan bread, variety breads, soft buns, hard rolls, bagels, pizza dough and flour tortillas, and the like. The ingredients found in such bread-type dough systems include flour, water, fat and sweetener (e.g., sugar), and betaine in the ranges indicated hereinabove. In the betaine containing bread type dough systems, the flour is preferably present in amounts ranging from about 25% to about 58% (dry weight) and more preferably from about 28% to about 56% (dry weight). The fat in these products is preferably present in amounts ranging from about 3% to about 12% and more preferably about 3% to about 10% (dry weight). The sweetener is preferably present in amounts ranging from about 1% to about 18% (dry weight) and more preferably from about 3% to about 13% (dry weight). Preferably, they also contain leavening agents and salt.

Exemplary bakery products which can be manufactured from sweet dough systems include danishes, croissants, crackers, puff pastry, pie crust, biscuits, cookies, and the like. The ingredients of sweet dough systems of the present invention include sweetener (e.g., sugar), flour, fat, and betaine in the amounts indicated hereinabove. In the betaine containing sweet dough products, the flour is preferably present in amounts ranging from about 15% to about 45% (dry weight) and more preferably from about 15% to about 40% (dry weight). The fat is present in amounts ranging from about 6% to about 20% (dry weight) and more preferably from about 6% to about 18% (dry weight). The sweetener is preferably present in amounts ranging from about 12% to about 25% (dry weight) and more preferably from about 12% to about 22% (dry weight).

Exemplary bakery products which can be made from batter systems include cakes (such as sponge, foam, devil's food, pound, cheesecake, layer cake and the like), donuts or other yeast raised cakes, brownies and muffins. These products prepared in accordance with the present invention contain fat, flour, water, sweetener (e.g., sugar) and betaine in the amounts indicated hereinabove. In the betaine containing batter products of the present invention, the fat is preferably present in amounts ranging from about 15% to about 28% (dry weight), and more preferably from about 15% to about 23% (dry weight). The flour is preferably present in amounts ranging from about 15% (dry weight) to about 45% and more preferably from about 15% to about 40% (dry weight). The sweetener is preferably present in amounts ranging from about 12% to about 28% (dry weight) and more preferably from about 12% to about 25% (dry weight). Other additives that are preferably present include yeast or chemical leavening agents and salt. Glazes, fillings, icings and jellies which typically contain sweetener (e.g., sugar) and fat as conventional ingredients are examples of products which can be made from topping and creme systems. These toppings and cremes are those that are baked with the dough or batter, not ones that can be applied to the finished bakery product after baking.

The betaine containing toppings and creme of the present invention are comprised of sweetener, fat water and betaine in the amounts indicated hereinabove. In these systems, the sweetener is preferably present in amounts ranging from about 18% to about 38% (dry weight) and more preferably from about 18% to about 30% (dry weight). The fat is preferably present in amounts ranging from about 15% to about 30% (dry weight) and more preferably from about 15% to about 28% (dry weight).

The exact ingredients in the above exemplary systems and amounts thereof may vary depending on the recipe employed. It is noted that the amounts of the conventional ingredients in such baked goods is not critical to the present invention. Instead, the present invention is limited by only the amount of betaine that is employed in the bakery system.

The betaine containing baked goods of the present invention are prepared in accordance with standard techniques, except that betaine is added in the amounts indicated hereinabove to the ingredients of the baked good product prior to baking ("hereinafter referred to as," "baked good ingredients prior to baking" or "premix")

In accordance with the present invention for dough or batter containing products of the present invention, betaine is added to a flour containing base batter mix. The expression flour containing base batter mix as used herein refers to the typical batter or dough compositions for chemically leavened batter system, yeast leavened bread type dough systems, and sweet dough systems.

As is well known in the art of preparing culinary product, the precise formulation of the flour containing base batter mix well vary depending upon the precise bakery product one seeks to make.

For example, in a dough system, betaine is added to a composition of matter comprising sweetener, flour and fat.

Betaine may be added to a dry mix or it can be added to a dry mix to which water has been added. It is also within the contemplation of the present invention to add betaine to a dry mix and then to combine the same with moist bakery ingredients.

After adding betaine to the ingredients of the baked good system, the betaine-containing ingredient is then subjected to mixing. Mixing is typically carried out under conditions which produce a uniform distribution of solids within a stable aqueous dispersion and which is capable of providing a uniform distribution of betaine in the bakery ingredients. Mixing is performed by methods which are conventionally used in the art. Mixing may be accomplished in a one, two or more step operation. For example, some of the ingredients may be mixed, the additional components added and then the components are mixed again. The mixing may be performed by hand or with a mixing apparatus such as a hand-held mixer or a free-standing mixer. Alternatively, the dry ingredients are combined in a batch-type mixer and the resulting mix is passed through a mixing unit which will produce a uniform aqueous dispersion, such as a homogenizer or a continuous mixer. The mixing speed and time may vary depending on the type of bakery product being produced, and they may be easily ascertained by the skilled artisan.

The dough or batters are generally prepared at a temperature of less than about 115° F. and at or above 50° F. Exemplary dough or batter temperatures may range from about 60° F. to about 77° F. Before proceeding to the next step, the dough or batter may be permitted to lay for about 20 minutes to about 120 minutes to hydrate and achieve optimum consistency.

For certain baked goods, such as cookies, the dough or batter is next shaped or formed into pieces using conventional shaping equipment, e.g., cookie dough forming equipment. For instance, the doughs may be sheeted between counter rotating rollers and cut using rotary or reciprocating cutters. They may be formed into pieces by wire cutting, rotary-molding, enrobing, encrusting and the like. They may be formed into shape by conventional means, such as a calender press, an extruder or continuous mixer.

If filler is desired, the filled products may be produced by co-extruding the dough, batter or dough like mixture with filler materials. The co-extrudate may be formed by the use of a concentric die or a tube inserted within the die orifice. Filled products may also be produced by transporting the dough-like mixture to a conventional enrobing or encrusting machine.

Examples of fillers which may be used include chocolate-, vanilla-, butterscotch-, fruit-, peanut butter-, and cheese-flavored fillings. The filling material may also be a separately produced dough or batter for the production of multi-flavored, multi-colored or multi-textured baked good product, e.g., cookie. Fillers may be low fat or fat-free. The fillers may be uncooked or cooked prior to co-extrusion with the doughs of the present invention.

The cutting of dough ropes or extrudates before or after baking may be performed by a guillotine-cutter, a band cutter, fluid jet cutter or the like.

This shaping of the dough or batter, if necessary, is usually performed prior to baking and subsequent to the mixing step.

The mixed betaine-containing ingredients may optionally be placed in a suitable vessel which is capable of producing a desired bakery product. It is also possible to refrigerate the mixed betaine-containing bakery composition prior to baking. This is particularly required with yeast-containing bakery systems.

If cookies are the desired bakery product, the mixed betaine-containing bakery system is divided into appropriate pieces using, for example, a spoon, and then placed on a cookie sheet. When pies, cakes, breads, doughnuts and muffins are the desired bakery product, appropriate sized pans are employed.

The next step of the present invention involves exposing the mixed betaine-containing mixture to heat for a sufficient time to effect an adequate degree of cooking (baking) of the betaine-containing mix. This step of the present invention which is a baking step may be carried out in an oven or a bread making machine which is capable of heating the betaine-containing bakery system with dry heat. The exact temperature and time used to bake the various betaine-containing bakery system varies for different dough formulations, oven types, etc. However, the mix is exposed to cooking conditions for the appropriate time and temperature to achieve a complete bake. Typically, batter systems used in making cookies are heated to a temperature of from about 310° F. (154° C.) to about 350° F. (177° C.) for a time period of from about 9 minutes to about 20 minutes or until golden brown. When bread-type or sweet dough systems are employed, the heating step is typically carried out at a temperature of from about 300° F. (149° C.) to about 450° F. (232° C.) for a time period of from about 25 minutes to about 30 minutes.

After baking, the finished bakery product is allowed to cool before packaging and/or consumption.

The toppings and cremes systems are generally prepared in the following way. The ingredients of the toppings and cremes, e.g., sweetener, fat (e.g., shortening) or a combination thereof and the additional ingredients described hereinabove and betaine are mixed together. As before, the betaine may be added to a dry mix or it can be added to a mix which additionally contains water. The ingredients are mixed as described hereinabove and then baked, as before. The mixture is then permitted to stand for sufficient amount of time to set.

In the case of coatings, glazes or icings, the mix is placed on top of the dough or batter and then baked. In the case of filler material, it is coextruded with the dough, batter or dough like mixture, as described hereinabove and then baked, as described hereinabove.

The baked goods of the present invention may additionally contain jellies. The jellies in the baked goods may or may not contain betaine. In a preferred embodiment, if jelly is present in the baked goods, the jelly also contains betaine in the aforementioned amounts. The jellies are typically made using conventional techniques. Even if betaine is present, the jellies are prepared by conventional techniques, except that betaine is added thereto. The traditional process used for making jelly is the open kettle, batch boiling technique. In jelly manufacture, the fruit is boiled under conditions sufficient to extract the pectin and destroy the pectin—hydrolyzing enzyme present therein. The juice is then separated by straining or pressing, and the press cake is boiled with more water to obtain more pectin. If too much pectin is removed, commercial pectin is added. Sugar (dry or liquid) and betaine, if present, are next added to the juice and then mixed thoroughly until the betaine is uniformly distributed therethrough. The mixture is then boiled for a second time to concentrate the juice until the critical point for gelling is obtained and then the product is allowed to cool down to the appropriate cooking temperature, which varies according to the fruit, but which temperature range for cooking is early determined by the skilled artisan.

The baked good product produced in accordance herewith may be shelf-stable, refrigerated or frozen.

The addition of betaine provides several advantages to the baked goods. This one added ingredient provides characteristics that are only achievable by the addition of several ingredients to the baked goods, such as emulsifiers, fibers, fruits, gums and enzymes.

In one embodiment of the present invention, the baked good product containing betaine retards moisture migration and retains moisture longer than non-betaine containing baked goods. As indicated hereinabove, most baked goods tend to lose moisture to the air, dry out and become hard and tough too quickly. The baked goods prepared in accordance with the present invention do not suffer from this problem. The baked goods of the present invention containing betaine are more moist. They have an increased ability to retain moisture longer. Thus, another embodiment of the present invention is directed to a process for retarding moisture migration in a baked good comprising adding betaine in a moisture retarding effective amount to the unbaked ingredients of the baked goods product, mixing the betaine containing ingredients under conditions effective to substantially uniformly distribute the betaine therethrough and baking the mix under conditions sufficient to form the desired product.

Increased moisture retention gives improved anti-staling properties to the baked goods. Thus, another embodiment to the present invention is directed to a method for extending the shelf life of a baked good product which comprises adding an anti-staling effective amount of the betaine to the unbaked ingredients of the baked good product and then repeating the steps described hereinabove.

Moreover, the baked good products containing betaine of the present invention have additional advantages. For example, the inventors have found that the addition of betaine in the baked goods enhances flavor. For example, expert flavor panelists were asked to taste the baked good products containing betaine and compare it to the taste of the same baked good products in which betaine was not used as an ingredient. Surprisingly, the baked goods of the present invention were better tasting, and had a more intense flavor. Moreover, baked goods of the present invention containing betaine have a smoother mouthfeel and softness relative to baked good products which do not contain betaine.

Thus, another embodiment of the present invention is directed to a method of enhancing the flavor of a baked good product, which comprises adding a flavor enhancing effective amount of betaine to the uncooked ingredients of the baked good product and then mixing and baking as described hereinabove.

In addition, another advantage of the use of betaine in baked goods is that it improves batter and dough processing. More specifically, the addition of the betaine to the dough or batter mix especially in the critical fat to betaine ratio described herein, decreases the viscosity thereof relative to the identical batter and dough in which betaine was not present. As a result, the presence of the betaine facilitates mixing the ingredients, i.e, the mixing required was not as vigorous as in the case when betaine is absent. Moreover, the presence of betaine facilitated kneading, when required for the baked goods.

In addition, the use of betaine in the critical fat to betaine ratio described herein imparts better machinability characteristics to the dough or batter, such as better make-up performance (i.e., better dividing, rounding and molding characteristics), thereby facilitating the processing of the baked goods. It has been found that the presence of betaine in effective amounts results in the baked good products exhibiting improved qualities, e.g., softer texture, enhanced taste, smoother mouthfeel, and the like, relative to the goods containing no betaine. Thus, another embodiment of the present invention is directed to a method for enhancing the organoleptic properties of baked goods which comprises admixing an organoleptic improving effective amount to the ingredients of the unbaked goods, then mixing the ingredients and baking as hereinabove.

In each of the embodiments described hereinabove, the preferred effective amounts of betaine are within the ranges given hereinabove.

Another advantage is that the betaine in the baked goods lowers the water activity relative to the same baked goods wherein betaine is absent. The water activity of the baked goods of the present invention is preferably less than about 0.80 and more preferably less than 0.65 to assure microbial shelf stability.

The inventors have found that betaine serves the functions of several types of ingredients typically found in baked goods. For example, they have found that the betaine in the foods achieves the softness, and shelf-life characteristics previously achieved by the use of additives in combination, such as (a) emulsifiers, e.g., lecithin and monoglycerides, (b) fibers, such as carboxymethylcellulose or wheat, (c) gums, such as xanthan gums, and arabic gums, locust bean, (d) fruits such as prune paste and (e) enzymes, such as alpha amylase and bacterial amylase, which amylases are known to improve dough characteristics.

Thus, the presence of betaine in the baked good in the effective amounts described hereinabove imparts several advantages thereto.

The following examples are given to illustrate the scope of the invention. Because these examples are given for illustrative purposes only, the invention embodied therein should not be limited thereto.

Unless indicated to the contrary, all weights are given by percentages of dry weight of the baked good.

As used herein, the term "dry mix" as used herein is meant to include the starting ingredients of the unbaked bakery product to which betaine is added.

Moreover, the term "sweetener" as used herein includes both sugar and sugar substitute or combination thereof.

EXAMPLE 1

In this example, reduced fat, reduced calorie chocolate chip cookies were produced in accordance with the process of the present invention. Specifically, the following ingredients were employed in making the reduced fat, reduced calorie cookies of the present invention:

| Ingredient | Amount (grams) |
| --- | --- |
| White granulate sugar | 106.0 |
| Polydextrose | 45.0 |
| Lactitol | 30.0 |
| All purpose shortening | 84.5 |
| Pastry Flour | 350.0 |
| Betaine | 30.0 |
| Salt | 4.5 |
| Baking soda | 5.0 |
| Whole eggs | 80.0 |
| Water | 32.0 |
| Vanilla Flavor | 3.0 |
| Butter Flavor | 3.0 |
| Total | 773.0 |

Specifically, the sugar, polydextrose, lactitol and shortening were creamed in a HOBART® mixer at a low mixing speed for about 2 minutes or until a substantial homogeneous mixture was obtained. The dry ingredients including betaine were then added to the creamed mixture and mixed for an additional two minutes at the same mixing speed. Water and flavoring agents were added to incorporate all ingredients together and form a dough. Chocolate chips were folded into the dough and then the dough was divided into 30 gram pieces on a cookie sheet pan. The cookie sheet pan containing the dough pieces were then placed in an oven and baked at 350° F. for about 15 minutes or until surface browning occurred and the center of the cookie was well baked. After baking, the cookies were removed from the oven, cooled and packaged.

For comparison, cookies were prepared using the above procedure except that no betaine was used. At day 1 of baking, the control cookies containing no betaine had 9.0% moisture and 0.58% water activity whereas the cookies containing 3.0% betaine contained 9.8% moisture and 0.54% water activity. At day 14 after baking, the control cookies contained 8.3% moisture and 0.56% water activity while the cookies of the present invention contained 9.4% moisture and 0.51% water activity. Similar results were observed at 30 days after baking.

Texture of the cookies were measured by a TA-XT2 texture analyzer and showed that the cookies containing betaine were softer at 14 days after baking than the control cookies. Sensory panelists also perceived that the cookies containing betaine were softer and better tasting than the control cookies.

The data above establishes that the cookies containing betaine had higher moisture content, lower water activity, softer texture and better flavor than control cookies which did not contain betaine.

EXAMPLE II

In this example, reduced fat, reduced calorie brownies were prepared in accordance with the present invention and a comparison was made to brownies which did not contain betaine as an ingredient. The brownies of the present invention contained the following ingredients:

| Ingredients | Amount (grams) |
| --- | --- |
| Cake flour | 240.0 |
| Polydextrose | 40.0 |
| Lactitol | 35.0 |
| Betaine | 30.0 |
| Natural Cocoa Powder, 10–12% | 60.0 |
| White granulated sugar | 160.0 |
| All purpose shortening | 120.0 |
| Salt | 45.0 |
| Whole eggs | 110.0 |
| Water | 150.0 |
| Corn Syrup | 50.0 |
| Vanilla Flavor | 1.0 |
| Total | 1011.0 |

The brownies of the present invention were prepared by blending betaine with the dry material, i.e. polydextrose, sugar, cocoa powder, lactitol, flour and salt. Next, shortening, eggs, water and corn syrup were added to the blend to form a brownie batter. The batter was then poured onto a brownie pan and baked at 350° F. for about 30 minutes. The brownies were cooled to approximately 92° F. before cutting and packaging.

Control brownies were prepared using the same ingredients and procedure as indicated above except that no betaine was added.

At 1 day after baking, the control brownies without betaine contained 7.6% moisture and 0.88% water activity. The brownies of the present invention containing betaine had 8.8% moisture and 0.78% water activity. At 14 days after baking, the control brownies had 7.0% moisture and 0.85% water activity whereas the brownies containing betaine contained 8.6% moisture and 0.72% water activity. The texture profiles measured by the TA-XT2 texture analyzer showed that the brownies containing betaine were softer than the control brownies at 14 days after baking. Sensory evaluation also showed that the betaine-containing brownies of the present invention were softer than the control brownies at day 14. Higher moisture content, lower water activity, softer texture and better flavor were noted for the brownies of the present invention as compared with the control brownies at 21 days after baking.

The above embodiments and examples are given to illustrate the scope and spirit of the invention. These embodiments and examples will make apparent to one skilled in the art other embodiments and examples. These other embodiments and examples are within the contemplation of the present invention; therefore, the instant invention should be limited only by the appended claims.

What is claimed is:

1. In an improved baked good product comprising (a) a fat content selected from the group consisting of fat, fat substitute, and combination thereof; (b) sweetener, water and optionally flour, the improvement comprising the presence of betaine in amounts ranging from about 0.5 to about 5.0 wt % and a weight ratio of said fat content to betaine ranging from about 50:1 to about 3:2.

2. The improved baked good product according to claim 1 in which the weight ratio of fat content to betaine range from about 25:1 to about 2:1.

3. The improved baked good product according to claim 1 in which the weight ratio of fat content to betaine range from about 10:1 to about 3:1.

4. The improved baked good product of claim 1 wherein the betaine is present in amounts ranging from about 0.5 wt % to about 4.0 wt %.

5. The improved baked good product of claim 1 wherein the betaine is present in about 3 wt %.

6. The improved baked good product according to claim 1 wherein the baked good comprises sweetener, fat, water and betaine.

7. The improved baked good product according to claim 1 wherein the baked good comprises sweetener, water, fat, betaine, and flour.

8. The improved baked good product according to claim 6 wherein said baked goods is a bread-type dough system, a sweet dough system, batter system, topping or creme system or a frozen bread type dough system.

9. The improved baked good product according to claim 1 or 6 whereby ascorbic acid is not present.

10. The improved baked good product according to claim 7 or 8 containing polydextrose or sugar alcohol or combination thereof.

11. The improved baked good product according to claim 10 wherein said sugar alcohol is lactitol, maltitol, sorbitol, isomalt or HSH.

12. The improved baked good product according to claim 1 comprising by weight from about 15% to about 55% flour, about 3% to about 15% water, about 2% to about 35% fat, about 12% to about 25% sweetener and about 0.5 to about 5% betaine.

13. A process for improving the organoleptic properties of a baked good product comprising:
  (a) admixing betaine in an amount ranging from about 0.5 wt % to about 5% with the uncooked ingredients of a baked good comprising water, sweetener, fat content and optionally flour in the desired amounts until the betaine is substantially evenly dispersed throughout; and
  (b) exposing the product of (a) to heat for a time sufficient to completely bake the product of step (a) and form a baked good product.

14. The process according to claim 13 wherein flour is additionally present.

15. The process according to claim 13 wherein the uncooked ingredients additionally contain additives.

16. The process according to claim 13 wherein ascorbic acid is not present in the baked good.

17. The process according to claim 13 wherein ascorbic acid is present in the baked good.

18. The process according to claim 13 or 14 wherein betaine is present in amounts ranging from about 0.5 wt % to about 4.0 wt %.

19. The process according to claim 17 wherein the betaine is present in an amount of about 3% by weight.

20. The process according to claim 13 or 14 wherein the ingredients are thoroughly mixed to form a uniform mass.

21. The process according to claim 13 wherein the product produced is a bread type dough system, sweet dough system, batter system, topping and creme, or frozen-bread-type dough system.

22. The process according to claim 13 or 14 wherein the product contains polydextrose or sugar alcohol or combination thereof.

23. The process according to claim 22 wherein said sugar alcohol is lactitol, maltitol, sorbitol, isomalt or HSH.

24. The process according to claim 13 wherein the weight ratio of the fat content to betaine ranges from about 50:1 to about 3:2.

25. A process for improving the shelf-life of a baked good which comprises:
  (a) admixing betaine in a shelf-life extending effective amount with the uncooked ingredients of a baked good until the betaine is substantially evenly dispersed therethrough; and
  (b) baking the product of step (a).

26. The process according to claim 25 wherein the betaine is present in amounts ranging from about 0.5 to about 5% by weight.

27. The process according to claim 25 wherein the weight ratio of the fat content to betaine ranges from about 50:1 to about 3:2.

28. A process for retarding the loss of moisture in a baked good which comprises:
  (a) admixing betaine in a water retaining effective amount with the desired amount of the uncooked ingredients of the baked good until the betaine is substantially evenly distributed therethrough; and
  (b) baking said product of step (a).

29. The process according to claim 24 wherein the betaine is present in amounts ranging from about 0.5 wt % to about 5 wt %.

30. The process according to claim 28 wherein the weight ratio of fat content to betaine ranges from about 50:1 to about 3:2.

31. A process for facilitating the preparation of a baked good product comprising:
  (a) adding betaine to a batter or dough mix comprising (a) a fat content selected from the group consisting of fat, fat substitute and combination thereof, (b) sweetener, (c) water and (d) optionally flour, in a weight ratio of fat content to betaine ranging from about 50:1 to about 3:2 and mixing the batter or dough mix until the betaine is substantially uniformly distributed therethrough; and
  (b) baking the product of (a).

32. The process according to claim 31 wherein betaine is present in amounts ranging from about 0.5% to about 4.0% by wt.

33. The process according to claim 13 wherein the product of step (a) is extruded prior to cooking.

* * * * *